June 23, 1959

W. W. KENNEDY 2,891,576

AIR MIXING DAMPER

Filed March 29, 1955

INVENTOR.
Walter W. Kennedy
BY
*Carlson, Pitzner, Hubbard & Wolfe*
ATTORNEYS

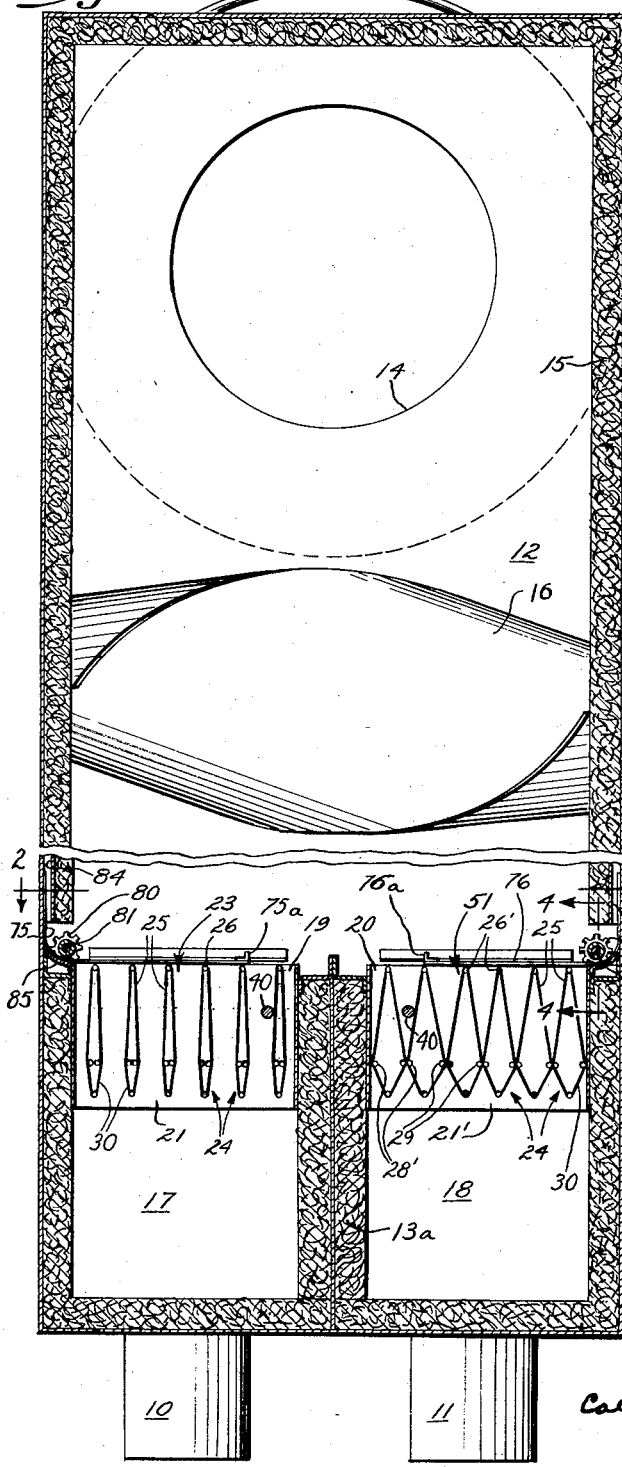
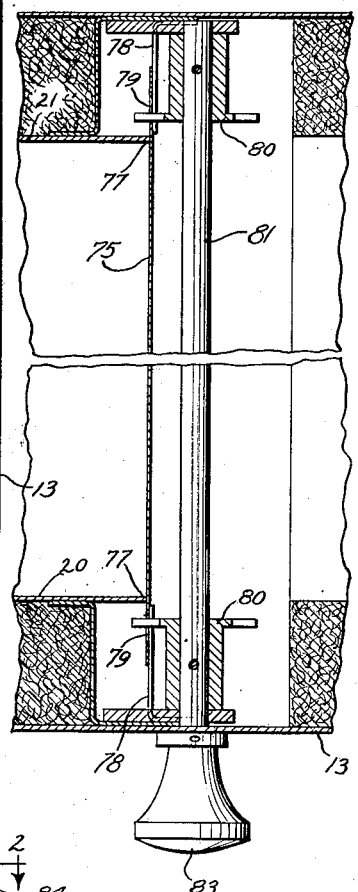

June 23, 1959 W. W. KENNEDY 2,891,576
AIR MIXING DAMPER
Filed March 29, 1955 4 Sheets-Sheet 3
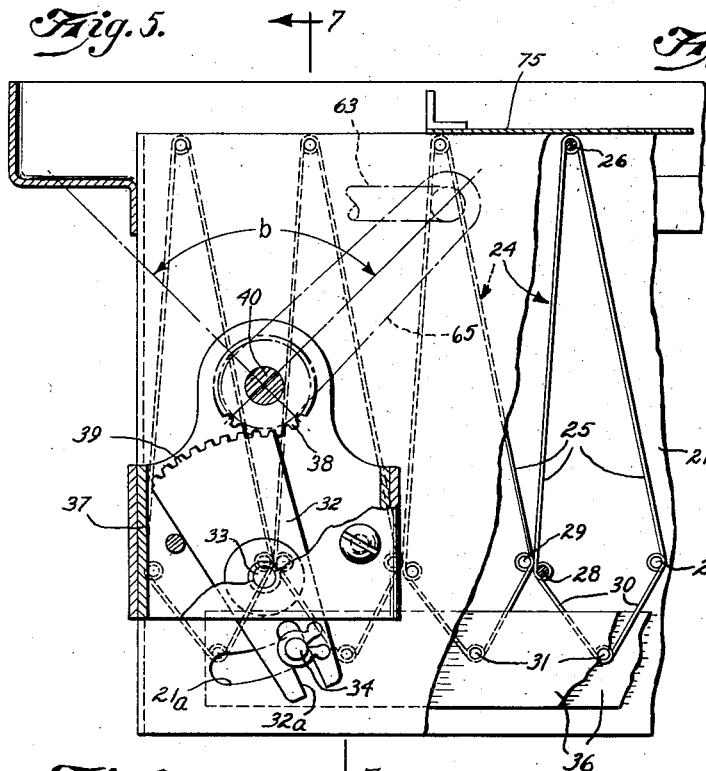
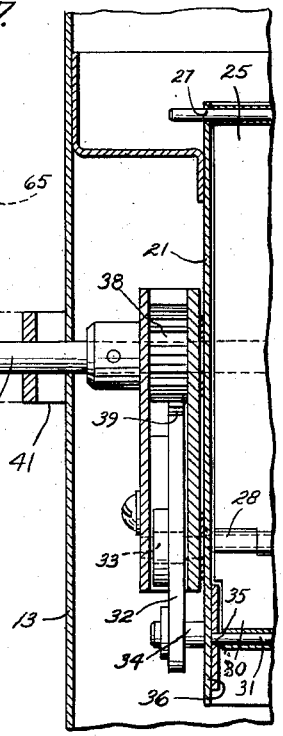
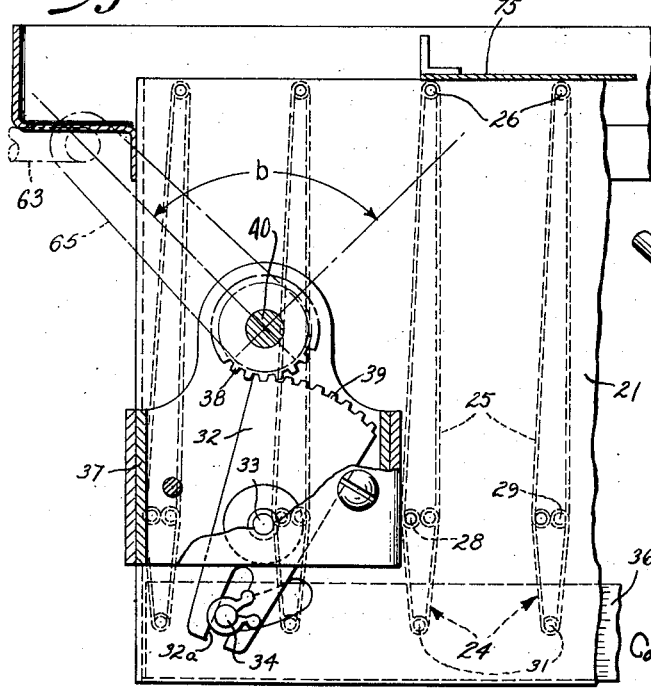
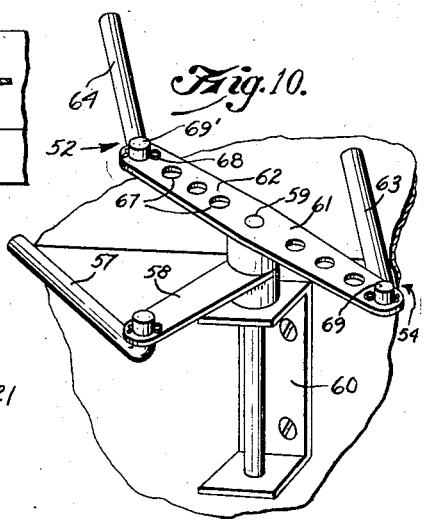
INVENTOR.
Walter W. Kennedy
BY
ATTORNEYS

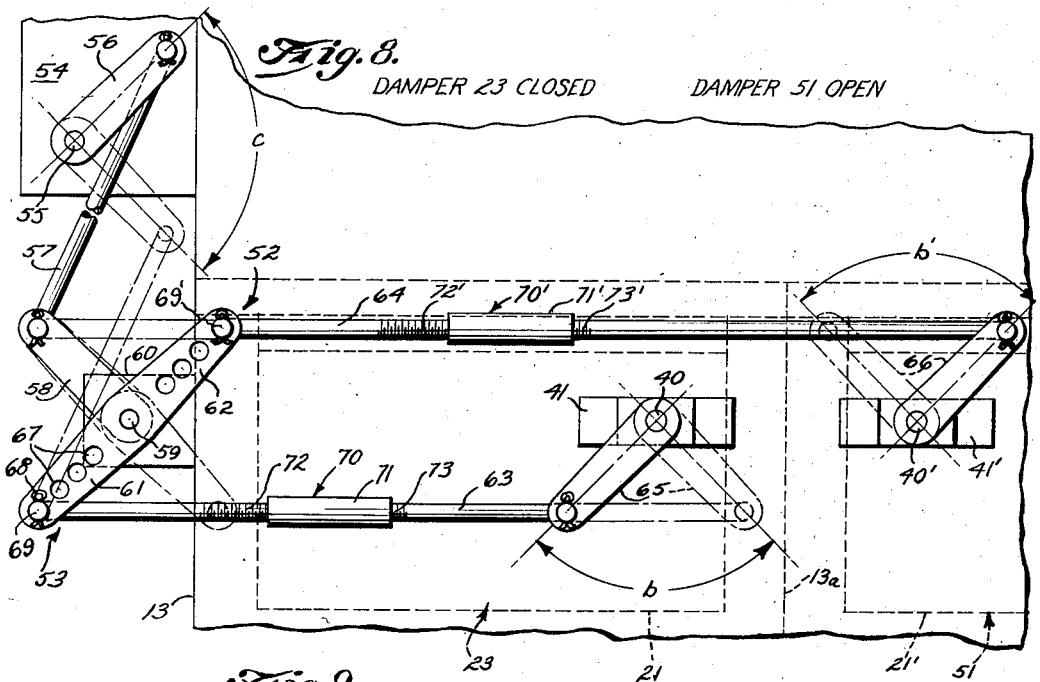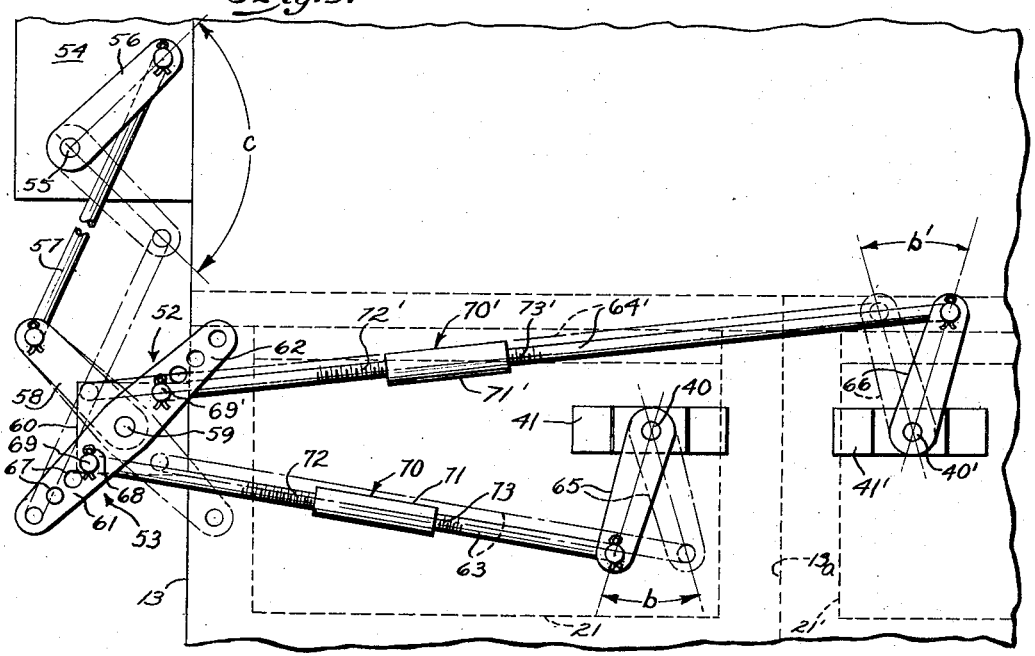

United States Patent Office 2,891,576
Patented June 23, 1959

2,891,576

AIR MIXING DAMPER

Walter W. Kennedy, Rockford, Ill., assignor to Barber-Colman Company, Rockford, Ill., a corporation of Illinois Application March 29, 1955, Serial No. 497,504

4 Claims. (Cl. 137—613)

This invention relates to a damper especially adapted for use in air conditioning systems for proportioning the flow of gases such as air from different pressure sources to produce a desired condition such as temperature of the resulting mixture.

The primary object is to provide a mixing damper of the above character which is adapted for power actuation and which is adjustable selectively in a novel manner to permit wide variations in the proportions of the two gases as well as the discharge velocity of the resulting mixture.

A more detailed object is to control the flow of the two gases to a mixing chamber by separate dampers coupled to a single actuator through novel connections individually adjustable to vary the lengths and the locations of the individual ranges of travel of the respective dampers during the full range of the actuator.

The invention also resides in the novel and simple construction of the actuating connections and the manner of their selective adjustment.

Other objects and advantages of the invention will become apparent from the following detailed description taken in connection with the accompanying drawings, in which Figure 1 is a fragmentary perspective view of an air mixing damper embodying the novel features of the present invention.

Fig. 3 is a longitudinal section taken along the line 3—3 of Fig. 2.

Fig. 4 is a fragmentary view taken along the line 4—4 of Fig. 3.

Figs. 5 and 6 are fragmentary sectional views taken along the line 5—5 of Fig. 2 showing the dampers in different positions.

Fig. 7 is a fragmentary section taken along the line 7—7 of Fig. 5.

Figs. 8 and 9 are plan views of the damper actuating linkages showing different adjustments thereof.

Fig. 10 is a fragmentary perspective view of part of the damper actuating mechanism.

Figure 1:
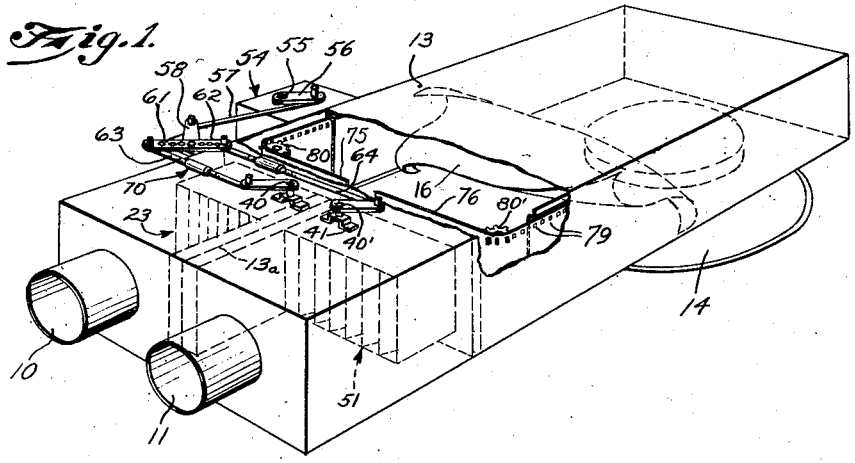
Figure 2:
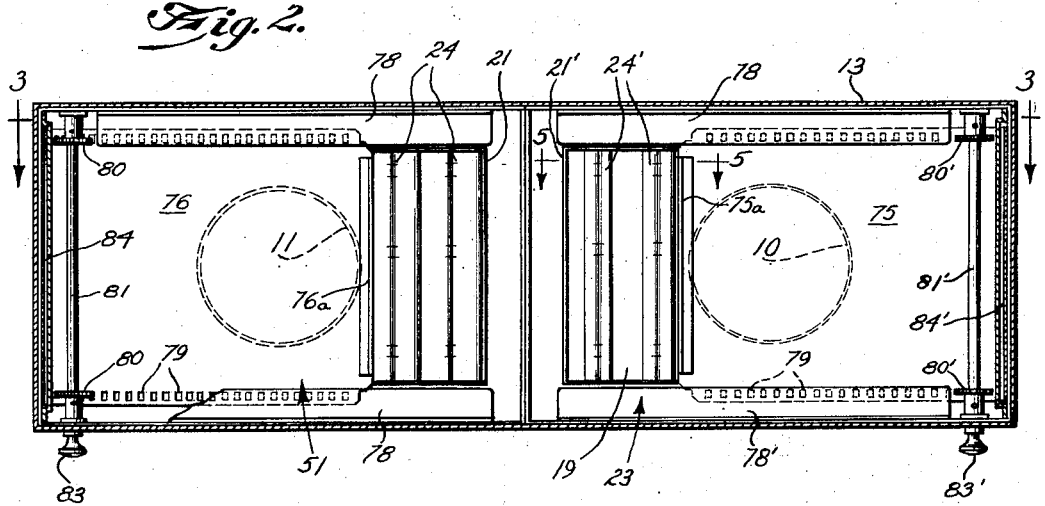
Fig. 2 is a transverse section taken along the line 2—2 of Fig. 3.

In the form shown in the drawings for purposes of illustration, the improved mixing damper is particularly adapted for proportioning the volumes of warm and cool air supplied under pressure through inlets 10 and 11 and delivered to a mixing chamber 12 within a duct 13 that may lead to a distribution outlet 14 from which it is desirable to discharge the mixture at different selected velocities or temperatures. Herein, the duct is an elongated tube of rectangular cross-section lined with sound absorbing material 15 and incorporating means such as baffles 16 to facilitate mixing of the two gases before the latter leave the outlet 14. Between the inlets 10 and 11 and the mixing chamber 12, the duct 13 and a sound absorbing partition 13ª define passages 17 and 18 which are disposed side by side and extend through generally rectangular frames 21 and 21' which define openings 19 and 20 at the ends of the passages and at the inlet end of the mixing chamber 12.

The flow of warm air through the opening 19 is regulated by a damper unit 23 which, in this instance, is composed of a series of vanes 24 disposed side by side across the passage 17 and individually expandable and collapsible laterally to vary the free air area between the adjacent vanes. Herein, the damper unit is enclosed within the frame 21 and each vane includes two plates 25 spanning two sides of the frame and hinged at one of their ends on a pivot rod 26 pivotally supported at opposite ends in holes 27 (Fig. 7) in side members of the frame. At their other ends, the plates 25 are pivotally connected by pintle pins 28 and 29 to the edges of shorter plates 30 which converge to and are joined at their opposite edges by floating hinges 31. Like the pin 26, the ends of the pin 28 are fixed in holes in the frame walls. The length of the pin 29 is equal to the width of the plates 25 and 30 and the hinge formed by the pin is free to float sidewise within the frame 21.

Beyond the ends of the hinge joining the plates 30, the rod 31 is extended into holes 35 (Fig. 7) in two bars 36 to which all of the rods of the different vanes are pivotally connected. Thus, the bars and the plates 30 between the hinge 31 and the fixed pivot pins 28 form a quadruple linkage movable between the limit positions shown in Figs. 5 and 6 in which the valve formed by the vanes 24 is fully closed and opened. In the closed position (Fig. 5) it will be noted that the hinge 29 is offset slightly out of the plane which includes the axes of the fixed pivot pins 28. This arrangement permits the axes of two the hinges, that is 26, 28 to remain fixed in the frame 21 to gain an advantage to be described later.

Bodily edgewise shifting of the bars 36 to open the damper varying degrees is effected in the present instance by turning a shaft 40 which projects outwardly from one wall of the duct 13 and is journaled in a subframe 37 disposed between the duct wall and the adjacent wall of the frame 21 as shown in Fig. 7. Fast on the shaft is a pinion 38 meshing with a toothed segment 39 on one end of a lever 32 fulcrumed intermediate its ends on a stud 33 on the frame 37. The other end of the lever is slotted as indicated at 32ª to receive a stud 34 which projects rigidly from one of the bars 36 through an arcuate slot 21ª in the wall of the frame 21.

With the pins 31 coupled to the bars 36 and the axes of the pins 26 and 28 fixed, it will be seen that the pins 29 of each vane will be moved toward and away from the fixed pin 28 of the same vane during shifting of the bars 36 edgewise during turning of the actuator shaft through a quarrter revolution $b$. In this way, the vanes 24, which are of generally air foil cross-section, are expanded and contracted laterally thereby changing the widths of the free air spaces between the adjacent vanes. Thus, the damper unit will be fully closed as shown in Fig. 5 when the vanes 24 have been expanded far enough to bring the intermediate hinges of the adjacent vanes into actual contact with each other. On the other hand, a maximum opening of the intervening spaces will be achieved when the vanes are fully collapsed as shown in Fig. 6.

A damper unit 51 (Fig. 3) is mounted in the passage 18 for regulating the flow of cold air through the opening 20 into the mixing chamber 12. This unit is of the same construction as the unit 23, and the corresponding parts are indicated by the same but primed reference numerals.

In accordance with the present invention, the rockshafts 40 and 40' for adjusting the vanes of the two damper units 23 and 51 are actuated by a single main operator 54 through separate motion-transmitting connections 52 and 53 which are constructed in a novel manner to enable the motion-transmitting ratios to be adjusted independently of each other and the location ranges of the operation of the dampers to be varied. The operator 54, when of the electric type, includes a reversible motor (not shown) operating through suitable reduction gearing to turn an output shaft 55 back and forth through a fixed operating angle $c$ (Fig. 8) determined by limit switches or the like. A suitable operator of this type is sold by Barber-Colman Company of Rockford, Illinois by the symbol YU–109. If desired, the operator may be attached to the duct 13 and the shaft motion transmitted to a convenient point by fixing to the shaft a crank 56 joined by a link 57 to the free end of a main actuating crank 58 fast on a shaft 59 which is journaled in a bracket 60 on the side wall of the duct.

While these connections may take various forms, they are shown herein as comprising crank arms 61 and 62 fast on the operating shaft 59 and pivotally connected through rigid links 63 and 64 with crank arms 65 and 66 which are fast on the respective damper shafts 40 and 40'. To provide for closing one damper during opening of the other, the cranks 61 and 62 project in opposite directions from the shaft 59 which forms the fulcrum of both of the levers.

One way of adjusting the motion-transmitting ratios between the actuator 54 to a damper unit 23 is to vary the effective length of the crank arm 56. Herein, this is accomplished by spacing a series of holes 67 along the arms 61, 62 so that after removing a cotter pin 68, the hooked end 69 of the link 63 may be removed and replaced in another selected one of the holes. In this way, the range $b$ of oscillation of the crank 65 in the fixed range $c$ of the main actuator 54 may be reduced in steps from a maximum (Fig. 8) when the link is connected in the outermost hole 67 to a minimum when the connection is at the innermost hole as shown in Fig. 9. Similar means is provided for adjusting the motion of the crank 66 for the fixed range of the main actuator, the parts of this means being indicated by the same but primed reference numerals in Figs. 8 and 9.

In another of its aspects, the invention provides for adjusting the location of the operating ranges $b$ and $b'$ of the damper shafts so that one of the dampers will be fully closed when the main shaft 55 is at one limit of its range and the other damper will be closed in the other limit position of this shaft. For this purpose, a device 70 is associated with the link 63 and operable manually to vary the length of the link and therefore the degree of opening of the damper for a given position of the arm 61. Herein, this device comprises a turnbuckle 71 threaded onto adjacent ends of the link 63 which is divided into two parts formed at their ends with right and left hand threads 72 and 73 at their ends. A similar turnbuckle device 71' is interposed between the two parts of the link 64.

With the linkage connections above described and adjusted, the warm and cool air dampers 23 and 51 will be fully open and fully closed respectively as shown in Fig. 3 when the operating shaft 55 is at one limit of its range as shown in full in Fig. 8. A maximum amount of warm air is then delivered to the mixing chamber through the passage 17 thus providing a maximum temperature of the air discharged through the outlet 14. As the operating shaft starts to turn and swings the crank 56 clockwise as viewed in Fig. 8, the cold air damper 51 starts to open and the damper 23 is closed a proportionate amount. At the limit position of the operating shaft 55 shown in phantom in Fig. 8, the warm air damper is fully closed and the cool air damper is open to the full extent determined by the position of its link 64 along the crank arm 62. By such accurate proportioning of the movement of the two dampers, the combined area of the openings through the two passages 17 and 18 remains constant for all positions of the power actuator, that is, the total volume of air delivered to the mixing chamber is fixed but the proportion of warm and cool air changes progressively to produce different desired temperatures of the mixture discharged from the outlet 14.

Now if it is desired to vary the ratio of warm and cool air delivered at any position of the actuator, the connection of one of the links 63, 64 is adjusted along its associated crank arm. For example, to decrease the amount of warm air, the link 63 would be set inwardly to the second or third hole 67 and the turnbuckle 70 adjusted to shorten the link so that the damper 23 will be fully closed in the corresponding limit position of the actuator. As a result, the total volume and velocity of air delivered through the outlet 14 would be reduced as would the temperature of the mixture owing to the increased amount of cool air therein. In this way, the ultimate temperature and velocity may be varied by simple manipulation of the linkages either individually or in combination so as to achieve any desired exit velocity in spite of the widely varying operating conditions encountered in service use such for example as pressure variations in the separate warm and cool air supplies.

Means of novel character is provided for enabling the total volume of air delivered through the outlet 14 to be adjusted independently of the linkages above referred to so that unforeseen conditions such as oversizing may be compensated for after installation of the unit. This means comprises auxiliary dampers 75 and 76 mounted on and preferably within the duct 13 for movement endwise across the openings 19 and 20 so as to block off selected areas of the latter without in any way obstructing or interfering with the air flow through the unblocked areas.

Preferably, each auxiliary damper is of the curtain type and comprises a thin flexible sheet of resilient material such as steel having opposite side edges disposed in guides which extend across the top and bottom walls of the duct 13 at the junction of the passages 17 and 18 and the chamber 12 and close to the fixed pivots 26 of the damper vanes. Herein, the guides are formed by the ends 77 (Fig. 4) of the damper frames 21 and 21' and the opposed surfaces of flanges 78 on angle bars spot welded to the top and bottom of the duct 13. Between the upper and lower guides the leading ends of the damper sheets are stiffened by welding cross bars 75ª and 76ª thereto.

Within the guides, each sheet or curtain is formed with holes 79 spaced apart to mesh with teeth on sprockets 80 disposed in the corners of the mixing chamber and fast on a vertical shaft 81 which is journaled in the duct walls and may be turned manually as by gripping a knob 83 fast on the end of the shaft projecting from the duct wall.

To enable the auxiliary dampers to be housed within the duct, each sheet is bent around its sprockets substantially through ninety degrees and then extended forwardly along the side wall of the duct into an elongated recess 84 formed by cutting away the outer part of the acoustical lining 15. An arcuate spacer 85 secured in the corner of the chamber 12 forms a backing for holding the bent portion of the damper sheet in mesh with the teeth of the sprockets.

It will be apparent that by turning the sprockets 80 the sheets 75 and 76 may be moved across the openings 19 and 20 to increase or decrease the areas of the latter and of the dampers 23 and 51 which are covered and thus blocked off by the auxiliary dampers. The latter may as shown be adjusted individually by turning the knobs 83 or, if desired, the shafts 81 may be coupled together by bevel gearing, preferably within the duct, so as to provide for adjustment of the auxiliary dampers in unison. By fixing the shafts 81 and 81' at the outlet ends of the damper passageways, the dampers 75 may be made of the curtain type and remain effectually in closing off any selected part of the chamber inlet irrespective of the prevailing degree of expansion of the associated damper vanes.

I claim as my invention:

1. The combination of, a casing defining an air duct of rectangular cross section, a plurality of expansible vanes spanning opposite side walls of said duct and having parallel edges laterally spaced apart across the duct between the other two walls and lying in a plane fixed longitudinally of the duct, said vanes and said other walls defining between them a plurality of parallel passages for the flow of air along said duct and each of said vanes being expansible and contractible laterally to vary the width of the adjacent passages while said edges remain in said plane, a curtain having one end portion spanning said first side walls of said duct and lying in a second plane paralleling and disposed closely adjacent said fixed edges of said vanes, and guides extending across said first side walls and supporting said curtain for edgewise sliding movement of said end portion in said second plane and across said fixed edges to coact therewith in sealing off varying numbers of said passages according to the length of said end portion.

2. The combination defined by claim 1 including a guide member disposed adjacent the intersection of said second plane and a third plane lying alongside one of said other walls of the duct, said curtain comprising a flexible sheet lying in said third plane and extending around said guide member and into said second plane, and means for guiding said sheet for movement in said third plane longitudinally of the duct thereby to move a varying length of the sheet around said guide member and into said second plane.

3. The combination defined by claim 2 in which said guide member comprises sprockets disposed adjacent the edges of said curtain and said curtain has spaced perforations spaced along the edges thereof and meshing with said sprockets.

4. The combination defined by claim 2 in which said guide member comprises rotary elements spaced apart transversely of said sheet and engaging the sheet to guide the latter from said third plane into said second plane.

References Cited in the file of this patent

UNITED STATES PATENTS

| 913,121 | Frayer | Feb. 23, 1909 |
| 973,882 | Rothe | Oct. 25, 1910 |
| 1,188,609 | Beer et al. | June 27, 1916 |
| 1,340,228 | Jackson | May 18, 1920 |
| 1,793,608 | Gramberg | Feb. 24, 1931 |
| 2,096,370 | Carmody | Oct. 19, 1937 |
| 2,616,656 | Crawford | Nov. 4, 1952 |
| 2,672,088 | Orr | Mar. 16, 1954 |

FOREIGN PATENTS

| 331,538 | Great Britain | July 3, 1930 |
| 897,639 | Germany | Nov. 23, 1953 |